(12) United States Patent
Whitfield, Jr. et al.

(10) Patent No.: US 11,860,643 B2
(45) Date of Patent: Jan. 2, 2024

(54) SYSTEM FOR CONTROLLING A PLURALITY OF AUTONOMOUS VEHICLES ON A MINE SITE

(71) Applicant: LIEBHERR MINING EQUIPMENT NEWPORT NEWS CO., Newport News, VA (US)

(72) Inventors: James Whitfield, Jr., Newport News, VA (US); Bryan Harper, Newport News, VA (US); Jason Altice, Denver, CO (US)

(73) Assignee: LIEBHERR MINING EQUIPMENT NEWPORT NEWS CO., Newport News, VA (US)

( * ) Notice: Subject to any disclaimer, the term of this patent is extended or adjusted under 35 U.S.C. 154(b) by 182 days.

(21) Appl. No.: 16/460,693

(22) Filed: Jul. 2, 2019

(65) Prior Publication Data
US 2021/0004024 A1    Jan. 7, 2021

(51) Int. Cl.
*G05D 1/02*     (2020.01)
*H04W 4/46*    (2018.01)

(52) U.S. Cl.
CPC ......... *G05D 1/0297* (2013.01); *G05D 1/0289* (2013.01); *H04W 4/46* (2018.02); *G05D 2201/021* (2013.01)

(58) Field of Classification Search
CPC .............. G05D 1/0297; G05D 1/0289; G05D 2201/021; H04W 4/46; H04W 4/025
See application file for complete search history.

(56) References Cited

U.S. PATENT DOCUMENTS 6,134,502 A    10/2000 Sarangapani
6,226,572 B1    5/2001 Tojima et al.
(Continued)

FOREIGN PATENT DOCUMENTS

WO    2014148975 A1    9/2014

OTHER PUBLICATIONS

European Patent Office, Extended European Search Report Issued in Application No. 20183644.2, dated Nov. 9, 2020, Germany, 10 pages.

*Primary Examiner* — Geepy Pe
*Assistant Examiner* — Daniel Tyler Reich
(74) *Attorney, Agent, or Firm* — McCoy Russell LLP

(57) ABSTRACT

A system for controlling a plurality of autonomous vehicles on a mine site comprises a centralized platform configured to store an inventory list of vehicles travelling on the mine site and configured to determine and communicate missions to the vehicles of a plurality of autonomous vehicles. The autonomous vehicles may comprise an interface configured to communicate with the centralized platform for receiving a predetermined mission, a trajectory control system configured to autonomously control the autonomous vehicle according to the predetermined mission, a detection system configured to detect other vehicles by evaluating sensor information received from at least one sensor of the vehicle, a collision prediction system configured to predict collisions with the other vehicles detected by the detection system, and a V2V communication interface for directly communicating with a V2V communication interface of at least one of the other vehicles on the mine site for exchanging information between the vehicles.

15 Claims, 6 Drawing Sheets

(56) References Cited

U.S. PATENT DOCUMENTS

| | | |
|---|---|---|
| 6,393,362 B1 | 5/2002 | Burns |
| 6,539,294 B1 | 5/2003 | Kageyama |
| 6,643,576 B1 | 11/2003 | O Connor et al. |
| 6,941,201 B2 | 9/2005 | Sudou |
| 7,603,235 B2 | 10/2009 | Makela et al. |
| 8,103,438 B2 * | 1/2012 | Petrie ................... G08G 1/164 |
| | | 701/119 |
| 8,606,495 B2 | 12/2013 | Makela et al. |
| 9,290,180 B2 | 3/2016 | Ichinose et al. |
| 9,483,056 B2 | 11/2016 | Kanai et al. |
| 9,598,823 B2 | 3/2017 | Tanaka et al. |
| 10,259,455 B2 | 4/2019 | Regmi |
| 2009/0088979 A1 | 4/2009 | Koch |
| 2009/0319112 A1 * | 12/2009 | Fregene ................ B60W 30/16 |
| | | 701/25 |
| 2011/0153541 A1 * | 6/2011 | Koch ..................... G06Q 10/06 |
| | | 706/52 |
| 2013/0261949 A1 * | 10/2013 | Eriksson ................ G05D 1/104 |
| | | 701/300 |
| 2014/0081505 A1 * | 3/2014 | Klinger ................. G08G 5/0004 |
| | | 701/25 |
| 2016/0185346 A1 | 6/2016 | Awamori et al. |
| 2016/0355184 A1 | 12/2016 | Ruth |
| 2017/0018188 A1 | 1/2017 | Ono et al. |
| 2017/0192429 A1 * | 7/2017 | Tseng ..................... H04W 4/02 |
| 2017/0220042 A1 | 8/2017 | Sakai et al. |
| 2017/0236422 A1 | 8/2017 | Naka et al. |
| 2018/0229733 A1 * | 8/2018 | Upmanue ....... B60W 30/18163 |
| 2018/0240346 A1 * | 8/2018 | Maeki .................... G01V 1/143 |
| 2020/0181879 A1 * | 6/2020 | Halder .................... E02F 9/205 |

* cited by examiner

SYSTEM FOR CONTROLLING A PLURALITY OF AUTONOMOUS VEHICLES ON A MINE SITE

TECHNICAL FIELD

The present invention relates to a system for controlling a plurality of autonomous vehicles on a mine site.

BACKGROUND AND SUMMARY

Autonomously controlled vehicles used on a mine site, such as autonomously controlled dumper trucks, may receive a mission from a centralized platform comprising a predefined trajectory to move from a start position to an end position. A vehicle control system of the autonomous vehicle may identify its current position and control the autonomous vehicle along the predefined trajectory.

The autonomous vehicle may comprise a detection system for detecting obstacles, such as other vehicles. While static obstacles may be taken into account when planning the trajectory, vehicles may not be taken into account when planning the trajectory for lack of knowledge on their position, such that the autonomous vehicle needs systems and methods for dealing with other vehicles in order to avoid collisions.

Centralized platforms can prevent the collision of autonomous machines, but they rely on a site wide network infrastructure which is prone to latency, outages and blind spots.

An object of the present invention is to provide a system for controlling a plurality of autonomous vehicles on a mine site having improved collision avoidance capabilities, such as improved capabilities to avoid collisions with other vehicles.

This and other objects may be solved by embodiments of the present disclosure.

In an aspect of the present disclosure, Vehicle to Vehicle (V2V) communication may ensure that autonomous machines that are in close proximity can communicate even during a network outage.

In an aspect of the present disclosure, sensor perception is augmented with V2V technology for the purpose of enhancing obstacle detection and classification. In an aspect, the present disclosure comprises the concept of altering autonomous vehicle behaviors as a result of the classification information available from V2V.

In an aspect, the present disclosure comprises the concept of augmenting sensor perception by fusing the information from V2V (e.g. obstacle pose, speed, heading, intentions).

In an aspect of the present disclosure, collision avoidance is based on V2V with intended path communication between vehicles used for path planning and intersection management. In an aspect, the present disclosure comprises the concept of altering autonomous vehicle behaviors as a result of the exchange in mission intentions (prior knowledge) utilizing V2V.

In an aspect, the present disclosure comprises the concept of discovering, identifying and classifying new obstacles with an appropriate V2V data exchange.

In a first embodiment, a system for controlling a plurality of autonomous vehicles on a mine site is provided, the system comprising:
 a centralized platform configured to store an inventory list of vehicles travelling on the mine site and configured to determine and communicate missions to the vehicles;
 a plurality of autonomous vehicles, the autonomous vehicles comprising:
  an interface configured to communicate with the centralized platform for receiving a predetermined mission,
  a trajectory control system configured to autonomously control the vehicle according to the predetermined mission,
  a detection system configured to detect other vehicles by evaluating sensor information received from at least one sensor of the vehicle,
  a collision prediction system configured to predict collisions with the other vehicles detected by the detection system;
 a V2V communication interface for directly communicating with a V2V communication interface of at least one of the other vehicles on the mine site for exchanging information between the vehicles.

In a second embodiment, a system for controlling a plurality of autonomous vehicles on a mine site is provided, the system comprising:
 a centralized platform configured to store a mine site map comprising a road network and an inventory list of vehicles travelling on the mine site and configured to determine and communicate missions to the vehicles;
 a plurality of autonomous vehicles, the autonomous vehicles comprising:
  an interface configured to communicate with the centralized platform for receiving a predetermined mission,
  a trajectory control system configured to autonomously control the vehicle according to the predetermined mission,
  a detection system configured to detect other vehicles by evaluating sensor information received from at least one sensor of the vehicle,
  a collision prediction system configured to predict collisions with the other vehicles detected by the detection system,
wherein the centralized platform is configured to communicate the mine site map to the autonomous vehicles for onboard storage, and wherein the collision prediction system of the autonomous vehicles is configured to determine a road from the road network used by another vehicle in its vicinity based on at least one out of sensor information and information received via a V2V interface from the another vehicle.

In a third embodiment, an autonomous vehicle is provided, the autonomous vehicle being configured to travel on a mine site, the mine site comprising a centralized platform configured to store an inventory list of vehicles travelling on the mine site and to determine and communicate missions to the autonomous vehicle,
 the autonomous vehicle comprising:
  an interface configured to communicate with the centralized platform for receiving a predetermined mission,
  a trajectory control system configured to autonomously control the vehicle according to the predetermined mission,
  a detection system configured to detect other vehicles by evaluating sensor information received from at least one sensor of the autonomous vehicle,
  a collision prediction system configured to predict collisions with the other vehicles detected by the detection system;

a V2V communication interface for directly communicating with a V2V communication interface of at least one of the other vehicles travelling on the mine site.

A method for detecting obstacles is provided by the present disclosure. Normally an autonomous vehicle would utilize sensor perception. While this may detect an obstacle, the ability to classify said obstacle can be limited. Classification will help to enable the autonomous vehicle to make decision on behaviors with respect to the detected obstacle. For example, detecting another autonomous vehicle versus a manned vehicle. Even further distinguishing the type of manned vehicle facilitates further differences in behavior.

For example when detecting another autonomous vehicle certain prior knowledge (e.g. mission intentions) can be exchanged to optimize behavior. When manned obstacles are classified decisions on behaviors can be made by the autonomous vehicle for behaviors such as overtaking. As an example, with V2V classification it is possible to identify a manned light vehicle (where overtaking may be prohibited) versus a manned motor grader (where overtaking may be allowed).

DETAILED DESCRIPTION OF THE INVENTION

In the following, embodiments of a system for controlling a plurality of autonomous vehicles on a mine site and embodiments of autonomous vehicles to be used on a mine site are described with respect to the drawings.

Figure 1:
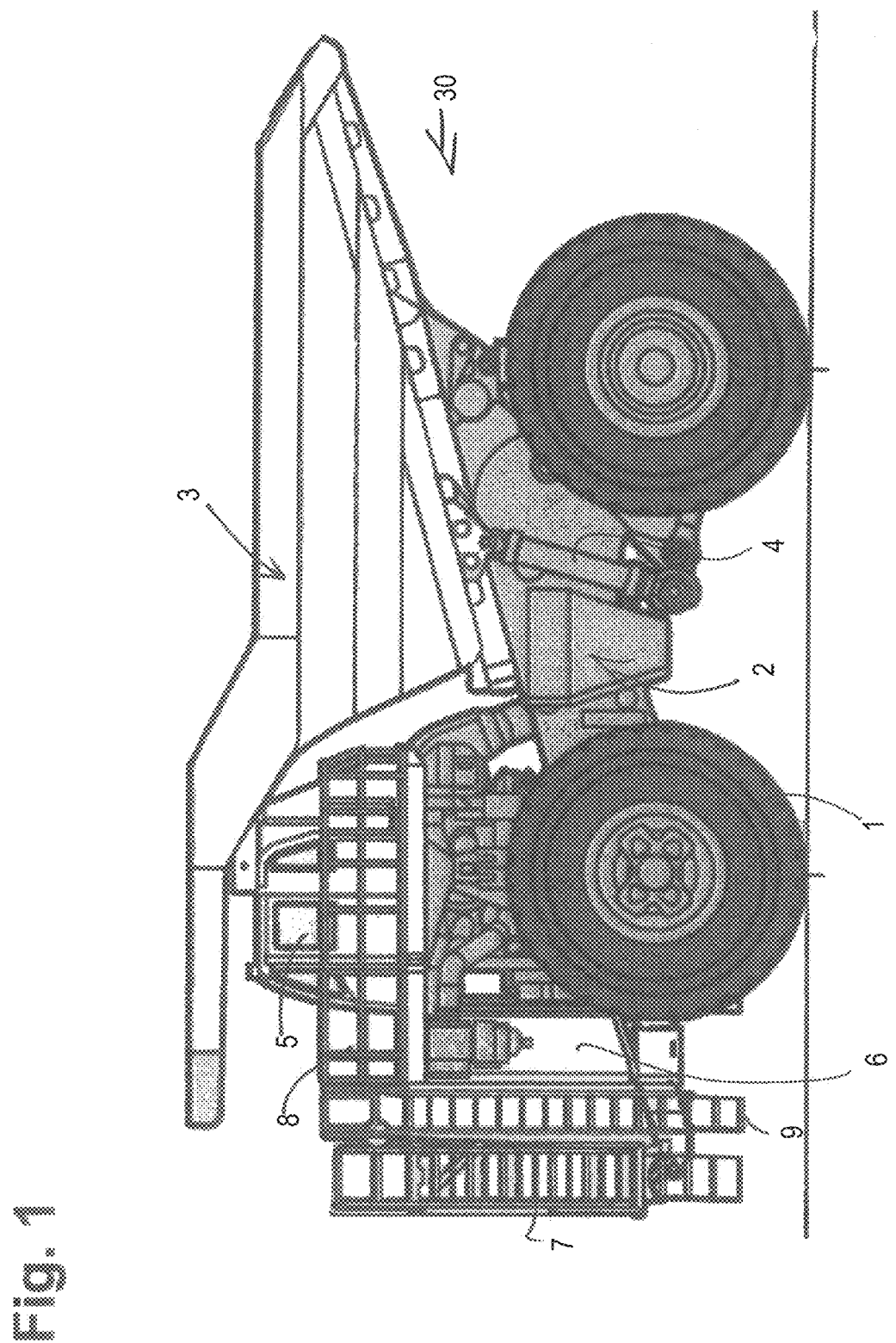
FIG. 1 is a side view of an embodiment of an autonomous dumper truck, the dumper truck forming an example of an autonomous vehicle of the present disclosure.

FIG. 1 shows an example of an autonomous vehicle to be used on a mine site. In the embodiment, the vehicle is a dumper truck as for transport purposes on the mine site. The dumper truck may have a payload of 100 metric tons or more.

The dumper truck 30 comprises a chassis 2 that is movable on wheels 1. The wheels 1 are driven by a drive unit 6 comprising at least one engine. The engine may be an internal combustion engine, e. g. a diesel engine. In an embodiment, the drive unit 6 may be a diesel-electric drive unit. The wheels may be driven by electric motors powered by a generator, the generator in turn driven by the diesel engine.

The dumper truck shown in FIG. 1 comprises a dump body 3 mounted on the chassis 2. The dump body is attached to the chassis with a horizontal pivot axis, and can be swiveled up by hoist cylinders 4 in order to let material contained in the dump body slide out of the dump body to the rear side of the dumper truck.

The dumper truck further comprises a cab 5 for a driver, in order to allow a manual operation of the dumper truck. In other embodiments, no cab may be provided. In the embodiment, the cab 5 is provided on a platform 8 arranged above the heat exchanger 9 and accessible via stairs 7.

The dumper truck further comprises a vehicle control system for autonomously controlling the vehicle.

Figure 2:
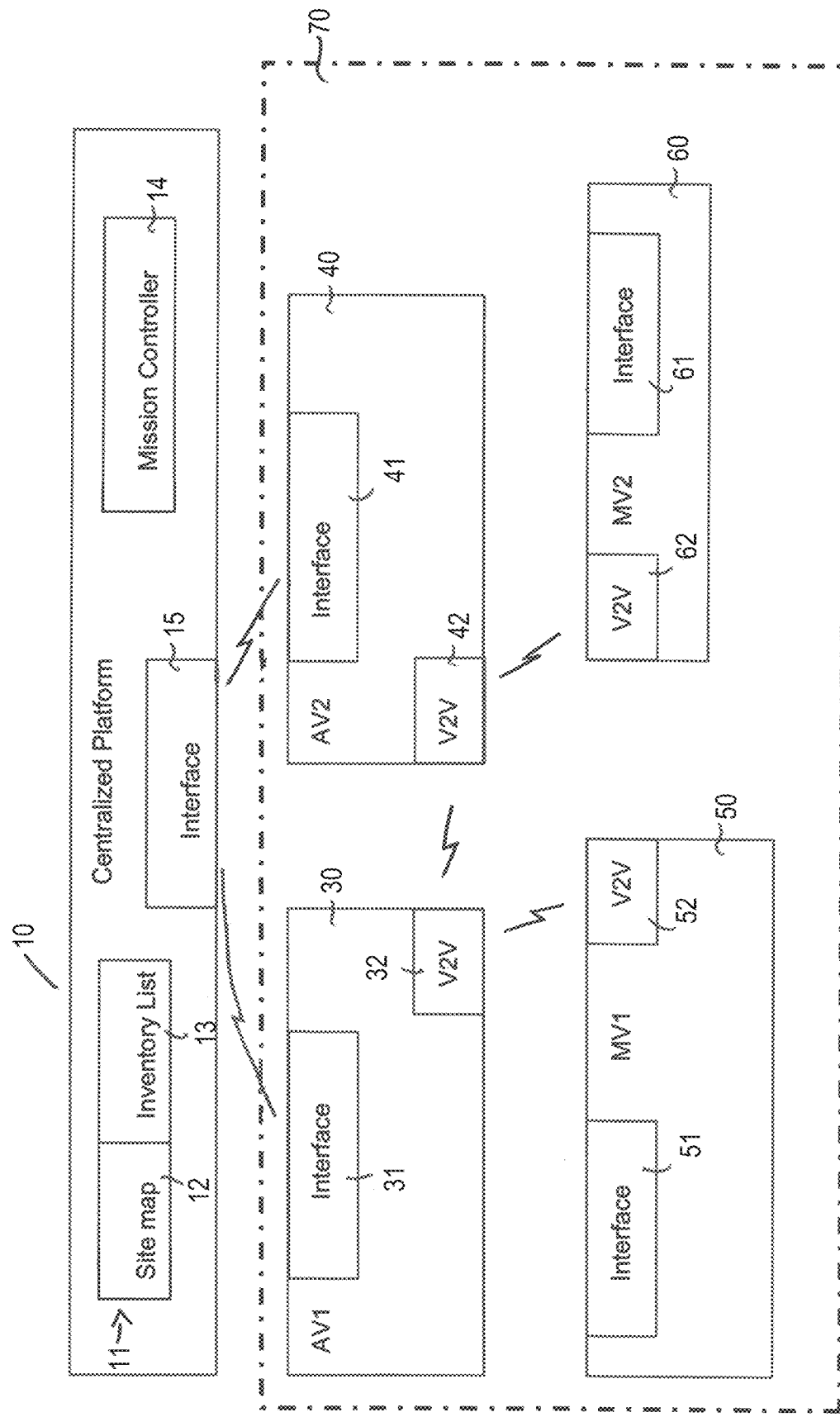
FIG. 2 is a schematic drawing showing functional parts of an embodiment of a system for controlling a plurality of autonomous vehicles on a mine site of the present disclosure.

FIG. 2 shows functional parts of an embodiment of a system for controlling a plurality of autonomous vehicles 30, 40 on a mine site 70, the system comprising a central platform 10, such as a fleet/traffic management system, and the plurality of autonomous vehicles 30, 40. Further, in an embodiment, the system may comprise manned vehicles 50, 60.

The centralized platform 10 may comprise at least one microprocessor and software stored on non-transitory memory, the software running on the microprocessor to implement the functionality and sub-systems of the centralized platform 10 and the features of the methods for controlling an autonomous vehicle described herein. The various sub-systems of the vehicle control system may be implemented by software and/or hardware components of the centralized platform 10. The centralized platform 10 may be further provided with input and/or output devices allowing supervision and/or control of the centralized platform 10 by personnel.

The centralized platform 10 may comprise a mission controller 14 configured to determine and communicate missions to the vehicles 30, 40. In particular, the centralized platform 10 may be configured to provide predetermined trajectories to the autonomous vehicles 30, 40.

In an embodiment, the centralized platform 10 comprises an electronic storage 11 configured to store an inventory list 13 of the vehicles 30, 40, 50, 60 travelling on the mine site 70. Further, the electronic storage 11 may be configured to store a site map 12 of the mine site.

For communication between the centralized platform and the vehicles 30, 40, 50, 60, the centralized platform 10 is provided with an interface 15 and the vehicles 30, 40, 50, 60 are provided with communication interfaces 31, 41, 51, 61. In an embodiment, the interfaces 15 and 31, 41, 51, 61 are wireless interfaces, in particular radio interfaces. In an embodiment, the mine site may be provided with a radio communication system, such as a cellular system, in order to provide the communication between the interface 15 of the centralized platform 10 and the communication interfaces 31, 41, 51, 61 of the vehicles 30, 40, 50, 60. In an embodiment, the radio communication system may cover all the traversable areas of the mine site, i.e. all the areas where the vehicles 30, 40, 50, 60 are allowed to travel.

Further, the vehicles 30, 40, 50, 60 are provided with V2V communication interfaces 32, 42, 52, 62 for directly communicating with each other. In an embodiment, the interfaces 32, 42, 52, 62 are wireless interfaces, in particular radio interfaces. The V2V communication interfaces may be short range interface allowing communication between two vehicles once they are close to each other.

Figure 3:
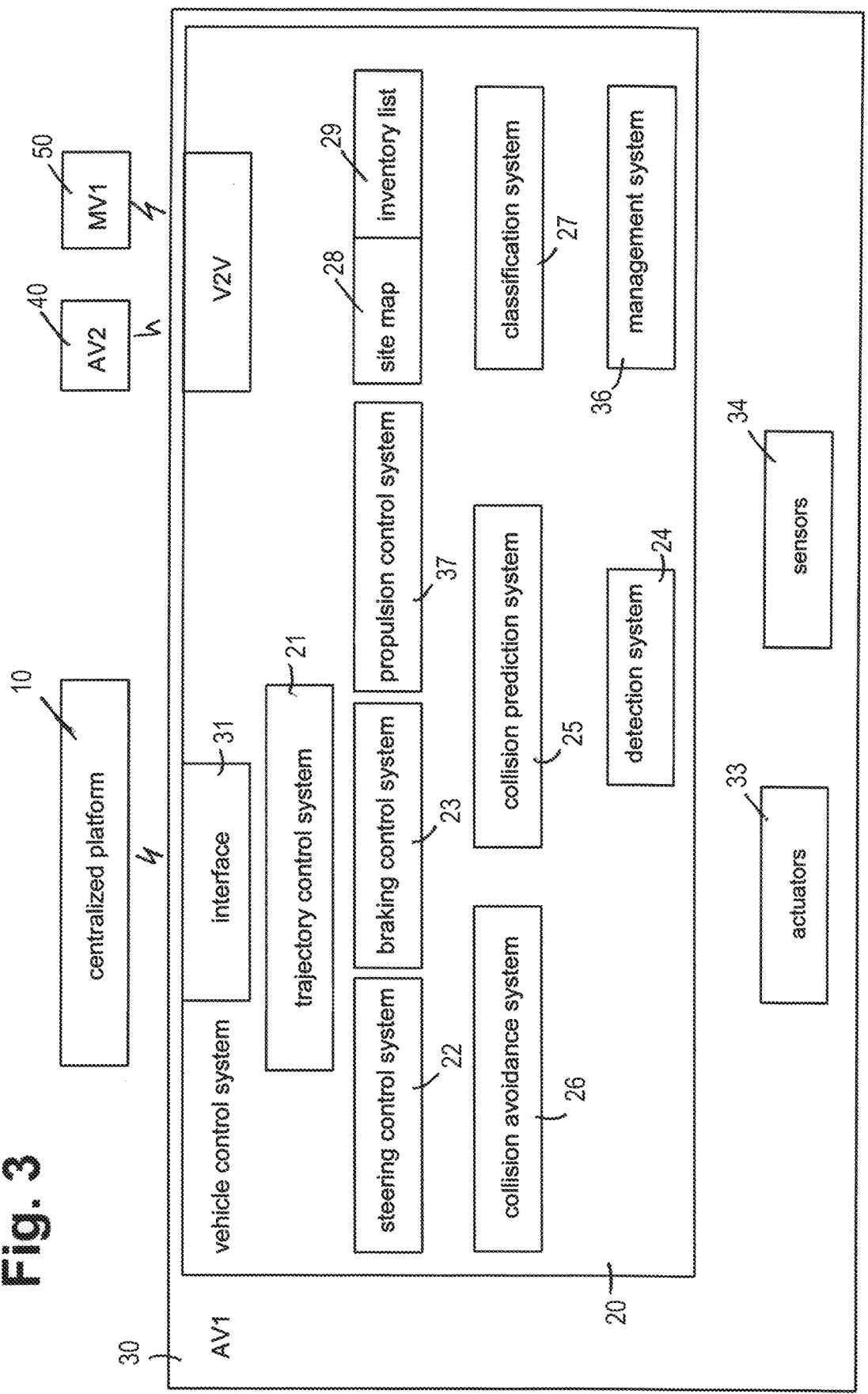
FIG. 3 is a schematic drawing showing functional parts of an embodiment of an autonomous vehicle of the present disclosure, FIG. 4 a schematic drawing showing different manned vehicles, FIG. 5 a schematic drawing showing intersection handling based only on sensor perception and FIG. 6 a schematic drawing showing intersection handling using V2V.

These and other functional parts of a vehicle control system 20 of an autonomous vehicle 30, as well as other components of the autonomous vehicle, are further described with respect to FIG. 3.

The vehicle control system may comprise at least one microprocessor and software stored on non-transitory memory, the software running on the microprocessor to implement the functionality and sub-systems of the vehicle control system and the features of the methods for controlling an autonomous vehicle described herein. The various sub-systems of the vehicle control system may be implemented by software and/or hardware components of the vehicle control system.

The vehicle control system 20 of the autonomous vehicle comprises the interface 31 configured to communicate with the centralized platform 10. In an embodiment, the interface 31 may be used for receiving a predetermined mission from the centralized platform 10. The centralized platform 10 and the autonomous vehicles 30 on the mine site may in particular communicate via a central radio network installed on the mine site.

The vehicle control system 20 of the autonomous vehicle may further comprise a trajectory control system 21. The trajectory control system 21 may be configured to autonomously control the autonomous vehicle 30 according to the predetermined mission received from the centralized platform 10.

In an embodiment, the vehicle control system 20 may comprise a steering control system 22 configured to control a steering system of the autonomous vehicle, a propulsion control system 37 configured to control a propulsion system of the vehicle and a braking control system 23 configured to control a braking system of the autonomous vehicle. The propulsion system may in particular comprise one or more motors for driving the wheels of the vehicle.

In an embodiment, the trajectory control system 21 may be configured to autonomously control the autonomous vehicle 30 via the steering control system 22, the propulsion control system 37 and the braking control system 23 to follow a trajectory defined by the mission. In particular, as part of the mission, the centralized platform 10 may communicate a predetermined trajectory to the autonomous vehicle 30, and the trajectory control system 21 may be configured to autonomously control the autonomous vehicle 30 via the steering control system 22 and the braking control system 23 along the predefined trajectory.

The vehicle control system 20 may further comprise a detection system 24. The detection system 24 may be configured to evaluate the signals of sensors 34 arranged on the autonomous vehicle.

The detection system 24 may be configured to detect obstacles such as other vehicles 40, 50, 60 by evaluating sensor information received from at least one sensor 34 of the autonomous vehicle.

In an embodiment, the detection system may further be configured to detect stationary obstacles.

In an embodiment, the detection system 24 may be configured to detect a position and/or pose of the autonomous vehicle on the mine site 70.

Further, the vehicle control system 20 may comprise a collision prediction system 25 configured to predict collisions with obstacles such as the other vehicles 40, 50, 60 detected by the detection system 24.

Further, in an embodiment, the vehicle control system may comprise a collision avoidance system 26. The collision avoidance system may be configured to autonomously re-plan a predetermined trajectory onboard the vehicle if the collision prediction system 25 predicts a collision, in order to provide a re-planned trajectory avoiding the collision.

The vehicle control system 20 may be connected to the sensors 34. At least one sensor 34 is connected to the detection system 24 and allows the detection system 24 to detect obstacles such as other vehicles.

The vehicle control system 20 may be further connected to actuators 33. Such actuators may include steering actuators connected to the steering control system 22, allowing the steering control system to steer the vehicle, and braking actuators connected to the braking control system 23, allowing the braking control system to brake the vehicle.

Further, as indicated above, the vehicle control system 20 may comprise a V2V communication interface 32 for directly communicating with V2V communication interfaces 42, 52, 62 of the other vehicles 40, 50, 60 on the mine site for exchanging information between the vehicles. In particular, the V2V communication may be independent from the central radio network used for communicating with the centralized platform 10.

In an embodiment, the information exchanged between the vehicles 30, 40, 50, 60 comprises localization information and future mission information.

In particular, the localization information provided by an autonomous vehicle via the V2V communication interface 32 may comprise the current position, heading and speed of the autonomous vehicle.

The future mission information may comprise path information on a trajectory to be followed by the vehicle. In particular, the path information may comprise information on a path that the autonomous vehicle will follow in the immediate future. The path information may cover a certain distance and/or travelling time from a current location and/or a current point in time.

In an embodiment, the path information may be used by the collision avoidance system 26 of the autonomous vehicle to avoid a collision with the other vehicle.

The collision avoidance system 26 may use predefined braking and yield rules to avoid a collision. For example, if the collision prediction system 25 predicts a collision based on the predetermined trajectory that the autonomous vehicle is currently following and the path information received by the other vehicle via the V2V interface 32, it may use predefined braking and yield rules to avoid the collision.

Figure 5:
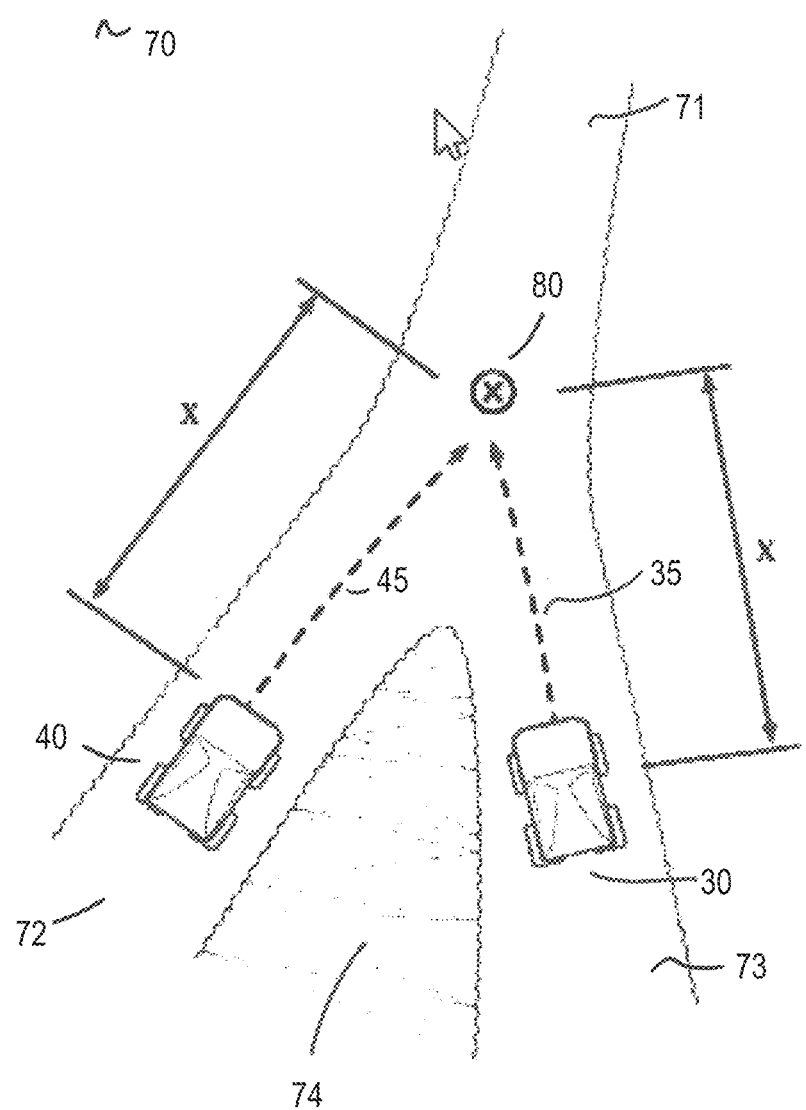

FIG. 5 shows a situation where a first autonomous vehicle 30 is driving along a first predetermined trajectory 35 along a first road 73 on the mine site 70, and a second autonomous vehicle 40 is driving along a second predetermined trajectory 45 along a second road 72 on the mine site 70.

In FIG. 5, the first road 73 and the second road 72 merge into a third road 71 at a crossing 80. Because of a hill 74 located between the first road 73 and the second road 72, the first autonomous vehicle 30 and the second autonomous vehicle 40 will only be able to notice each other based on sensor perception shortly before the crossing 80. In such a case, the distance x to the crossing 80 may be too short for the vehicles to avoid a collision.

Figure 6:
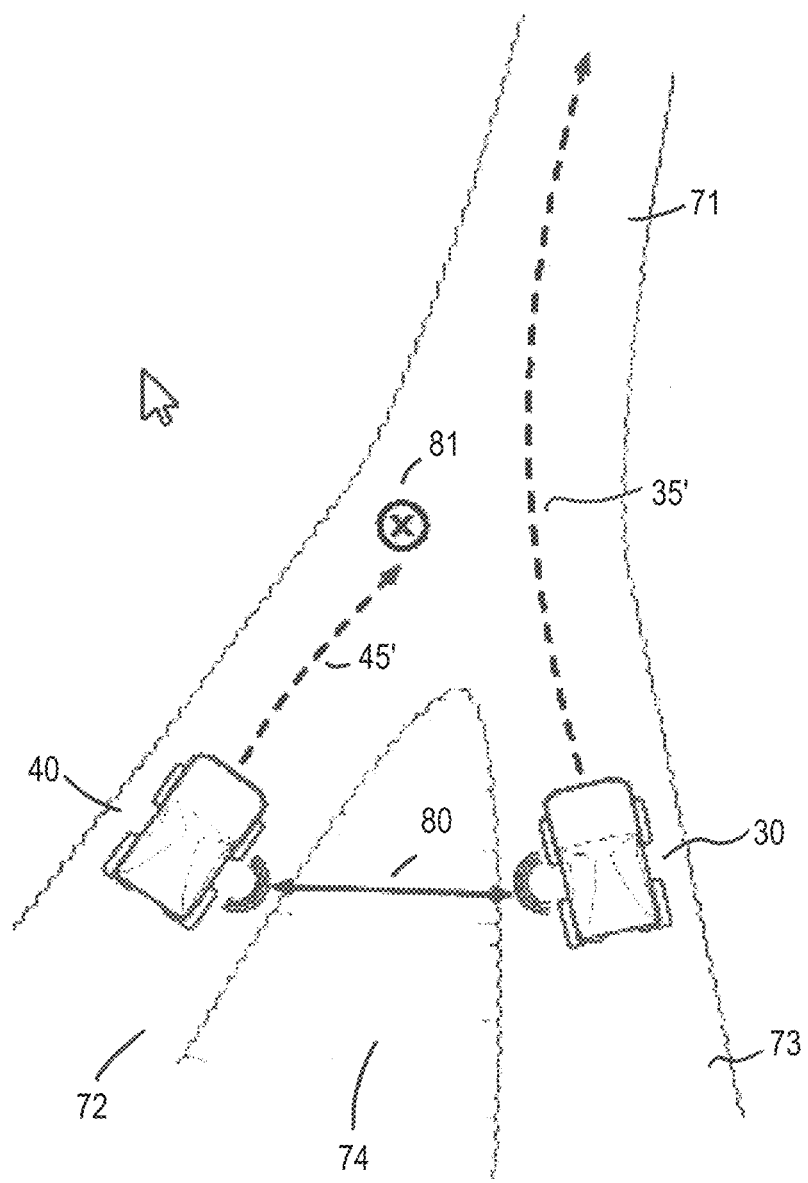

FIG. 6 shows the same situation as FIG. 5, but with the use of V2V communication 90 between the first autonomous vehicle 30 and the second autonomous vehicle 40. The V2V communication 90 is used to exchange location and path information on the predetermined trajectories that the first autonomous vehicle 30 and the second autonomous vehicle 40 are following. Thereby, the potential collision between the vehicles can be predicted early enough to change the behavior of at least one out of the first autonomous vehicle 30 and the second autonomous vehicle 40 in order to avoid the collision. Such collision can in particular also be avoided also in cases of an outage of a central radio network used for communicating between the vehicles and the centralized platform 10. Prior art approaches in contrast use the central radio network of the mine site to avoid these situations. The present concept uses V2V in addition to any radio network based planning that may occur and is thus tolerant to RF outages, latency and blind spots.

In particular, based on the path information and the predicted collision, the first autonomous vehicle 30 and the second autonomous vehicle 40 will apply a predefined yield rule, for example that the second autonomous vehicle 40, arriving from the left hand side, will yield to the first autonomous vehicle 30 arriving from the right hand side to the crossing. Therefore, based on the V2V data exchange, the vehicles can autonomously change their behavior to avoid the predicted collision, i.e. without receiving a corresponding command or mission update from the centralized platform 10.

Therefore, the second autonomous vehicle 40 will autonomously re-plan its predetermined trajectory to a new re-planned trajectory 45' and stop at waiting position 81 until the first autonomous vehicle 30 has passed the crossing.

In an embodiment, the predefined braking and yield rules may equally apply to collisions predicted without information received via the V2V interface 32.

In an embodiment, the V2V interface 32 may not be used for negotiating rules for behavior between the autonomous vehicles, but only for transmitting information on a vehicles intended behavior on which the other vehicle may react based on predefined rules.

The path information provided by the autonomous vehicle may comprise path information based on at least one out of predetermined trajectory received from the centralized platform and a re-planned trajectory provided by the collision avoidance system 26 in order to avoid a collision predicted by the collision prediction system 25 with a vehicle detected by the detection system 24.

For example, in FIG. 6, the second autonomous vehicle may transmit the re-planned trajectory 45' to the first autonomous vehicle 30. Thereby, the first autonomous vehicle 30 may follow, after receiving the re-planned trajectory 45', a trajectory 35' that does not involve any counter-measures against a collision. For example, the first autonomous vehicle 30 may not slow down at the crossing.

In an embodiment, the detection system 24 of the autonomous vehicle may fuse the sensor information used for detecting other vehicles with the information received from another vehicle via the V2V communication interface in order to augment sensor perception on the another vehicle.

In particular, the detection system 24 of the autonomous vehicle may fuse sensor information on a position, heading and/or speed of another vehicle with information on the position, heading and/or speed of this vehicle received from this vehicle via the V2V communication interface in order to provide an improved value for the position, size, dimensions, heading and/or speed of this vehicle used for predicting a collision with this vehicle.

As indicated above, in an embodiment, the system may further comprise a plurality of manned vehicles, the manned vehicles equally comprising a V2V communication interface for directly communicating with a V2V communication interface of at least one of the autonomous vehicles on the mine site for exchanging information between the vehicles.

In an embodiment, the vehicle control system 20 of the autonomous vehicle 30 may further comprise a classification system 27 for classifying vehicles according to their type.

In an embodiment, the information exchanged between the vehicles may comprise classification information, and the classification system 27 of the autonomous vehicle may be configured to determine a type of another vehicle in its vicinity based on the classification information received from said vehicle.

In an embodiment, the classification system 27 of the autonomous vehicle may be configured to determine a type of another vehicle in its vicinity based on sensor information received from at least one sensor of the autonomous vehicle. Therefore, the classification system will try to identify other vehicles also if they do not have a V2V functionality.

In an embodiment, the type may define whether a vehicle is an autonomous vehicle or a manned vehicle. Therefore, the classification system 27 will be able to differentiate between autonomous and manned vehicles.

In an embodiment, the autonomous vehicles may comprise a management system 36 for managing behavior with respect to other vehicles in their vicinity, wherein the management system 36 may be configured to use a first set of rules for a first type of other vehicle and a second set of rules for a second type of other vehicle, the first and the second type being determined by the classification system 27.

For example, the first type of vehicle may be an autonomous vehicle and the second type of vehicles may be a manned vehicle, such that the management system 36 may be configured to behave differently depending on whether a vehicle in its vicinity is an autonomous vehicle or a manned vehicle.

In an embodiment, the classification system may be configured to classify manned vehicles according to their manned vehicle type. In this case, the first type of vehicle may be a first type of manned vehicle and the second type of vehicle may be a second type of manned vehicle. Therefore, the management system 36 may be configured to behave differently depending on whether a vehicle in its vicinity is a first type of manned vehicle or a second type of manned vehicle.

Figure 4:
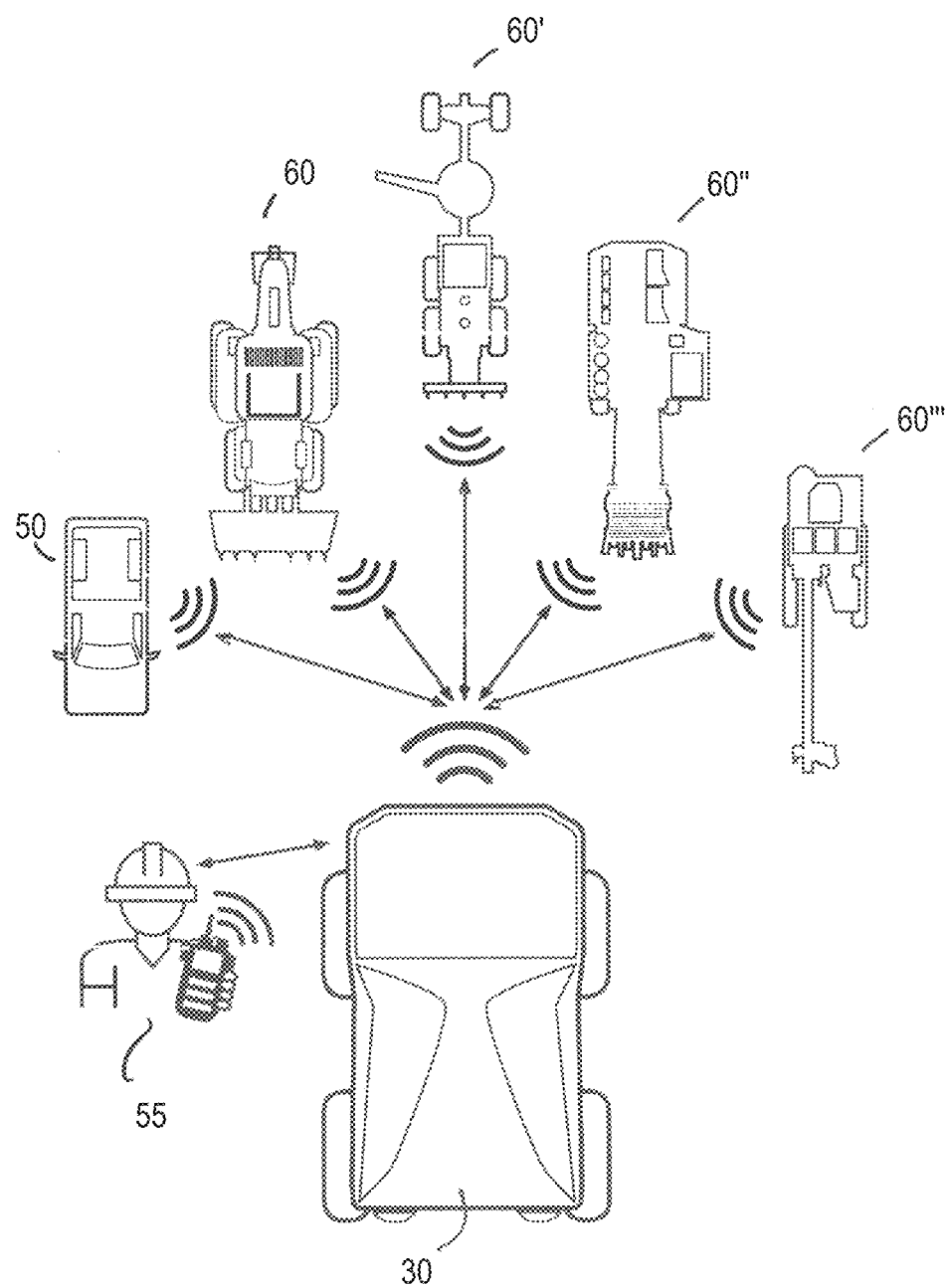

FIG. 4 shows an exemplary set of manned vehicles that an autonomous vehicle 30 may encounter on a mine site, such as a light vehicle 50, a dozer 60, a grader 60', an excavator 60" or a drill 60'". Further, the autonomous vehicle 30 may encounter personnel 55 equipped with a portable device. Such a portable device may equally comprise V2V functionality. In the context of the present disclosure, personnel 55 equipped with a portable device comprising V2V functionality will equally be regarded as a manned vehicle.

The light vehicle 50 and the personnel 55 may be classified as a first type of manned vehicle, and the dozer 60, grader 60', excavator 60" or drill 60'" may be classified as a second type of manned vehicle, such that different rules may apply to these to categories or types.

Further, in an embodiment, the management system 36 may be configured to use a first, second and third set of rules for a first, second and third type of other vehicle. In particular, the first and second type may be a first type of manned vehicle and a second type of manned vehicle, and the third type may be an autonomous vehicle.

In an embodiment, the management system 36 may be configured to manage at least one out of overtaking and intersection handling of other vehicles. In particular, overtaking and/or intersection handling of the autonomous vehicle with another vehicle in its vicinity may depend on the vehicle type determined by the classification system 27.

For example, overtaking may be prohibited for a first type of manned vehicle (such as a light vehicle 50) but may be allowed for a second type of manned vehicle (such as a dozer 60, a grader 60', a excavator 60" or a drill 60'").

In an embodiment, the centralized platform may be configured to communicate the inventory list of vehicles travelling on the mine site to the autonomous vehicle 30 for onboard storage in a corresponding inventory list electronic storage 29.

Further, the autonomous vehicle 30 may be configured to update the inventory list 29 stored onboard based on information received directly from other vehicles via the V2V interface 32. Therefore, if the autonomous vehicle has identified another vehicle based on information received directly from the other vehicle via the V2V interface 32, it may check whether the vehicle is contained in the inventory list 29. If not, it may update the inventory list 29.

Further, the autonomous vehicle 30 may be configured to update the inventory list 29 stored onboard based on sensor information. Therefore, if the detection system 24 detects another vehicle based on signals received from sensors 34, it may check whether the vehicle is contained in the inventory list 29. If not, it may update the inventory list 29.

The autonomous vehicle may be further configured to inform the central platform 10 of the updated inventory list 29.

In an embodiment, the centralized platform may be configured to store and communicate a mine site map comprising a road network to the autonomous vehicle 30 for onboard storage in a site map electronic storage 28.

Further, the collision prediction system 25 of the autonomous vehicle 30 may be configured to determine a road from the road network used by another vehicle in its vicinity based on at least one out of sensor information and information received via the V2V interface from the another vehicle.

By determining the road used by the other vehicle, the collision prediction system 25 will improve prediction results.

For example, if the road is a two-way road, the other vehicle is less likely to collide with the autonomous vehicle even if it is heading approximately in the direction of the autonomous vehicle driving on the same two-way road.

In such a situation, V2V may be used to augment the sensor perception to improve collision prediction by the collision prediction system 25 of a first vehicle and to prevent false interactions (e.g. stopping) with a second vehicle by the collision avoidance system 26 when the vehicle sensors of the first vehicle detect the second vehicle that appears, based on the sensor data, to be heading toward the first vehicle. By the information exchanged via V2V, the collision prediction system 25 of the first vehicle may be able to determine with more reliability that the second vehicle is not a threat to its trajectory, as it is, according to the trajectory exchanged via V2V, driving on the opposite side of the two-way road.

Such a situation may in particular occur in a two way road with slight curvature. In case the sensors of the first vehicle, such as lidar sensors, detect a second vehicle coming directly toward the first vehicle, the collision prediction system 25 of the first vehicle may predict, based on the sensor data, a collision and the collision avoidance system 26 may suggest to stop the first vehicle. But based on the V2V information received from the second vehicle, the collision prediction system 25 of the first vehicle would know that the second vehicle is following a curved trajectory, such that there is no risk of collision.

Further, if the other vehicle is driving on a road having an intersection with a road on which the autonomous vehicle is driving, a collision is more likely if no counter-measures are taken.

Therefore, the management system 36 may be configured to use a different behavior with respect to a vehicle in the vicinity depending on a road on which the vehicle is determined to be driving based on the site map 28.

An embodiment of a method for operating an autonomous vehicle on a mine site may comprise the following steps:
- sending a mission from a centralized platform 10 to the autonomous vehicle 30;
- autonomously controlling the autonomous vehicle 30 along a predetermined trajectory defined by the mission via a trajectory control system 21 of the autonomous vehicle;
- receiving information directly from another vehicle driving on the mine site via a V2V communication interface of the autonomous vehicle.

In an embodiment, the method may further comprise the steps:
- based on the information received from the another vehicle driving on the mine site via the V2V communication interface, predicting whether there is a risk of a collision;
- re-planning the predetermined trajectory in order to avoid the collision.

The method may use a system as described above. Further, the method may comprise the further steps and features described above with respect to the system.

The present disclosure comprises a second embodiment of a system for controlling a plurality of autonomous vehicles 30, 40 on a mine site 70, the second embodiment comprising similar functional components as the ones described above. Therefore, the second embodiment will equally be described with reference to FIGS. 1 to 3:

In the second embodiment, the system may comprise:
- a centralized platform 10 configured to store a mine site map 12 comprising a road network and an inventory list 13 of vehicles travelling on the mine site 70 and configured to determine and communicate missions to the vehicles 30, 40.
- a plurality of autonomous vehicles 30, 40, the autonomous vehicles comprising:
    - an interface 31 configured to communicate with the centralized platform 10 for receiving a predetermined mission,
    - a trajectory control system 21 configured to autonomously control the vehicle 30, 40 according to the predetermined mission,
    - a detection system 24 configured to detect other vehicles by evaluating sensor information received from at least one sensor 34 of the vehicle,
    - a collision prediction system 25 configured to predict collisions with the other vehicles detected by the detection system 24, In the second embodiment, the centralized platform 10 may be configured to communicate the mine site map 12 to the autonomous vehicles 30, 40 for onboard storage, and the collision prediction system 25 of the autonomous vehicles may be configured to determine a road from the road network used by another vehicle in its vicinity based on at least one out of sensor information and information received via a V2V interface 32 from the another vehicle.

Further, the centralized platform may be configured communicate the inventory list to the autonomous vehicles for onboard storage.

All the features described above with respect to the first embodiment may equally be applied to the second embodiment.

The present disclosure further comprises an autonomous vehicle 30 configured to travel on a mine site, the mine site comprising a centralized platform 10 configured to store an inventory list 13 of vehicles travelling on the mine site 70 and to determine and communicate missions to the autonomous vehicle.

In an embodiment, the autonomous vehicle 30 may comprise:
- an interface 31 configured to communicate with the centralized platform 10 for receiving a predetermined mission,
- a trajectory control system 21 configured to autonomously control the vehicle according to the predetermined mission,
- a detection system 24 configured to detect other vehicles by evaluating sensor information received from at least one sensor 34 of the autonomous vehicle,
- a collision prediction system 25 configured to predict collisions with the other vehicles detected by the detection system; and
- a V2V communication interface 32 for directly communicating with a V2V communication interface of at least one of the other vehicles travelling on the mine site.

In an embodiment, the V2V communication interface 31 may be configured for exchanging at least one out of vehicle type and mission information.

In an embodiment, the autonomous vehicle 30 may be configured as described above with respect to the system.

A more detailed embodiment of a system will be described in the following:

Autonomy Control

Mission plans to be delivered from the centralized platform 10 to the vehicle control system 20 of an autonomous vehicle 30 will include necessary high level paths to complete the requested mission. This may include a road assignment to follow, such as map following directions, detailed path assignments for spot (loading) locations, and dump locations. In addition, target speed along the path including any necessary intersection information, such as stop and yield rules will be provided. The vehicle control system 20 may be informed by the centralized platform about relevant vehicle traffic which the autonomous vehicle 30 may encounter while executing missions.

Onboard Mine Site Configuration Database

The centralized platform 10 maintains a Mine Site Configuration database including the mine site map 12 and the inventory list 13.

During start-up, the vehicle control system 20 is provided by the centralized platform 10 with a copy of the Mine Site Configuration database, which is stored onboard the vehicle in a database of the vehicle control system 20 as the mine site map 28 and the inventory list 29.

The vehicle control system 20 may accept updates to the Mine Site Configuration database from the centralized platform 10 during operation.

The Mine Site Configuration database stored onboard the vehicle may define:
  i. The Mine Map:
    a) Surface Models of all Operational Areas including roads, loading areas, dumping areas, maintenance areas, other drivable areas, etc.
    b) The Road Network including all road segments, intersections, road types (one way, two way), maximum road speeds, etc.
    c) Location information including their type and entry/exit coordinate information
    d) Mine map, in particular 3D mine site map.
  ii. Inventory List (Equipment Information operating in the Autonomy Operating Zone):
    a) autonomous vehicle Fleet information
    b) Manned Equipment and their types (OHT, Loading Tool, Service Equipment, Light Vehicles, etc.)

On-Coming Traffic Management

The complete road network stored onboard the vehicle may allow the vehicle control system to know that traffic detected is in a valid lane and not a threat even without V2V using its own perception capability.

The vehicle control system may match detected oncoming objects with probable segments within the road network. This allows the vehicle control system to classify an oncoming object as non-threatening even though it is positioned in the field of view of the perception sensors.

Additionally, at least some vehicles are provided with V2V to augment sensor perception. Not all assets may have V2V.

In particular, the vehicle control system may utilize V2V information to handle oncoming traffic. Oncoming traffic may be evaluated as in path or out of path based on its available V2V information. Handling of in path oncoming traffic may be determined based on available V2V information.

Intersection Management

The vehicle control system may use perception, predefined rules of intersections, and known position and trajectory of other assets in the network to avoid collision and/or unpredicted traffic.

V2V Communication

The vehicle control system may utilize Vehicle to Vehicle (V2V) communication to exchange information with other manned and autonomous systems within its vicinity.

The vehicle control system may send and receive information via a V2V interface 32.

The vehicle control system may provide information via the V2V system at predetermined rate. The information may be provided continuously without being interrogated by other vehicles or on request by other vehicles.

The information sent out by the vehicle control system of an autonomous vehicle via V2V may comprise one or more of the following information parts:
  i. Fused Localization autonomous vehicle Pose and Motion Information
    a. Latitude/Longitude (WGS 84 Coordinates)
    b. Heading
    c. Speed and Direction
  ii. Future Mission Information
    a. Interpolated path for a certain distance (Includes any path re-planning due to ODOA)
    b. ETA for each point on the path
  iii. Message Timestamp The vehicle control system may receive one or more of the following information parts from other autonomous assets via V2V:
  i. Fused Localization autonomous vehicle Pose and Motion Information
    a. Latitude/Longitude (WGS 84 Coordinates)
    b. Heading
    c. Speed and Direction ii. Future Mission Information
   a. Interpolated path for a certain distance (Includes any path re-planning due to ODOA)
   b. ETA for each point on the path
iii. Message Timestamp The vehicle control system may receive one or more of the following information parts from non-autonomous or manned assets via V2V:
   i. Asset number/identifier
   ii. Asset Position
   iii. Asset Speed
   iv. Asset Heading
   v. Asset Safety Bubble radius
   vi. Message Timestamp V2V Communications may be utilized by the vehicle control system with the following objectives:

Perception Augmentation

The vehicle control system may fuse V2V information with perception object detection information. The vehicle control system may match V2V communications with perception based object detection to aid in the identification and classification of objects.

The vehicle control system may supplement perception based object detections with V2V Communications by adding objects not detected via perception to the current set of detected objects.

The present disclosure thereby provides a concept of augmenting sensor perception with V2V technology for the purpose of enhancing obstacle detection and classification.

The invention claimed is:

1. An autonomous vehicle configured to travel on a mine site, the mine site comprising a centralized platform, the centralized platform comprising a microprocessor and software stored on a non-transitory memory configured to store an inventory list of vehicles travelling on the mine site and to determine and communicate missions to the autonomous vehicle,
   the autonomous vehicle comprising:
      an interface configured to communicate with the centralized platform for receiving a predetermined mission,
      a trajectory control system configured to autonomously control the autonomous vehicle according to the predetermined mission comprising a predetermined trajectory, wherein the predetermined trajectory is on a road of a road network of the mine site,
      a detection system configured to detect other vehicles by evaluating sensor information received from at least one sensor of the autonomous vehicle,
      a collision prediction system configured to predict collisions with the other vehicles detected by the detection system,
      a Vehicle to Vehicle (V2V) communication interface for directly communicating with a V2V communication interface of at least one of the other vehicles travelling on the mine site, wherein the V2V communication interface is configured for exchanging vehicle type information, wherein the interface and the V2V communication interface are wireless,
      a classification system for classifying vehicles according to their type, wherein the classification system of the autonomous vehicle is configured to receive a type of another vehicle in its vicinity for classification, wherein said another vehicle broadcasts their own vehicle type to the autonomous vehicle, and wherein the classification of said another vehicle is used by the autonomous vehicle to control the autonomous vehicle,
      wherein determining the type includes determining whether another vehicle is a manned vehicle or an autonomous vehicle, and
      a management system for managing behavior with respect to other vehicles in a vicinity, wherein the management system is configured to use a first set of rules for a first type of other vehicle and a second set of rules for a second type of other vehicle, the first and the second type being determined by the classification system, the management system being configured to manage at least one out of overtaking and intersection handling of the other vehicles,
   wherein the trajectory control system, the detection system, the collision prediction system, the classification system, and the management system are sub-systems stored as software on non-transitory memory of a microprocessor for a vehicle control system of the autonomous vehicle,
   wherein further information is exchanged between the autonomous vehicle and one of the other vehicles on the mine site via the V2V communication interface of the autonomous vehicle and a V2V communication interface of the one of the other vehicles on the mine site,
   wherein the further information comprises future mission information, wherein the future mission information is provided from the one of the other vehicles on the mine site to the autonomous vehicle,
   wherein the future mission information provided from the one of the other vehicles comprises path information on a further predetermined trajectory that is to be followed by the one of the other vehicles in the future, and
   wherein the path information is further used by the autonomous vehicle to control the autonomous vehicle.

2. The autonomous vehicle of claim 1, further comprising: a plurality of manned vehicles, the plurality of manned vehicles comprising: a V2V communication interface for directly communicating with a V2V communication interface of at least one of the other vehicles on the mine site, including the plurality of autonomous vehicles, for exchanging information.

3. The autonomous vehicle of claim 1, wherein the classification system of the plurality of autonomous vehicles is configured to determine a type of another vehicle in its vicinity based on sensor information received from at least one sensor of the plurality of autonomous vehicles.

4. The autonomous vehicle of claim 1, wherein the type defines whether a vehicle is an autonomous vehicle or a manned vehicle.

5. The autonomous vehicle of claim 1, wherein the classification system is configured to classify manned vehicles according to their manned vehicle type, wherein the first type of vehicle is a first type of manned vehicle and the second type of vehicle is a second type of manned vehicle.

6. The autonomous vehicle of claim 1, wherein the centralized platform is configured to communicate the inventory list of vehicles travelling on the mine site to the plurality of autonomous vehicles for onboard storage, and wherein the plurality of autonomous vehicles are configured to update the inventory list stored onboard based on at least one out of sensor information and information received via a V2V interface from another vehicle.

7. The autonomous vehicle of claim 1, wherein the V2V communication interface is further configured for exchanging future mission information, and wherein, during a condition in which the autonomous vehicle is driving along the road, and a second autonomous vehicle is further driving along a second predetermined trajectory along a second road on the mine site, wherein the road and the second road merge into a third road at a crossing, exchanging the mission information between the autonomous vehicle and the second autonomous vehicle via the V2V communication interface.

8. An autonomous vehicle configured to travel on a mine site, the mine site comprising a centralized platform, the centralized platform comprising a microprocessor and software stored on anon-transitory memory configured to store an inventory list of vehicles travelling on the mine site and to determine and communicate missions to the autonomous vehicle, the autonomous vehicle comprising:
an interface configured to communicate with the centralized platform for receiving a predetermined mission,
a trajectory control system configured to autonomously control the autonomous vehicle according to the predetermined mission comprising a predetermined trajectory, wherein the predetermined trajectory is on a road of a road network of the mine site,
a detection system configured to detect other vehicles by evaluating sensor information received from at least one sensor of the autonomous vehicle,
a collision prediction system configured to predict collisions with the other vehicles detected by the detection system,
a Vehicle to Vehicle (V2V) communication interface for directly communicating with a V2V communication interface of at least one of the other vehicles travelling on the mine site, wherein the V2V communication interface is configured for exchanging vehicle type information, wherein the interface and the V2V communication interface are wireless,
a classification system for classifying vehicles according to their type, wherein the classification system of the autonomous vehicle is configured to receive a type of another vehicle in its vicinity for classification, wherein said another vehicle broadcasts their own vehicle type to the autonomous vehicle, and wherein the classification of said another vehicle is used by the autonomous vehicle to control the autonomous vehicle,
wherein determining the type includes determining whether another vehicle is a manned vehicle or an autonomous vehicle, and
a management system for managing behavior with respect to other vehicles in a vicinity, wherein the management system is configured to use a first set of rules for a first type of other vehicle and a second set of rules for a second type of other vehicle, the first and the second type being determined by the classification system, the management system being configured to manage at least one out of overtaking and intersection handling of the other vehicles,
wherein the trajectory control system, the detection system, the collision prediction system, the classification system, and the management system are sub-systems stored as software on non-transitory memory of a microprocessor for a vehicle control system of the autonomous vehicle, and wherein the classification system is configured to determine the type of said another vehicle based on classification information broadcasted by said another vehicle and sensor information received from at least one sensor of the autonomous vehicle.

9. The autonomous vehicle of claim 8, wherein information exchanged between the plurality of autonomous vehicles comprises localization information and the future mission information, wherein the future mission information is provided from a respective vehicle of the plurality of autonomous vehicles to another vehicle of the plurality of autonomous vehicles, wherein the future mission information provided from the respective vehicle comprises path information on the predetermined trajectory that is to be followed by the respective vehicle of the plurality of autonomous vehicles in the future according to the predetermined mission, wherein the path information is used by a collision avoidance system of another one of the plurality of autonomous vehicles.

10. The autonomous vehicle of claim 9, wherein the plurality of autonomous vehicles further comprise a collision avoidance system, the collision avoidance system being configured to autonomously re-plan the predetermined trajectory onboard the plurality of autonomous vehicles if the collision prediction system predicts a collision, in order to provide a re-planned trajectory avoiding the collision, wherein the collision avoidance system is a sub-system stored as software on the non-transitory memory of the microprocessor for the vehicle control system, wherein in case that the predetermined trajectory received from the centralized platform as part of the predetermined mission is replaced by the re-planned trajectory for a first autonomous vehicle, the path information on the predetermined trajectory exchanged by the first autonomous vehicle is replaced by path information on the re-planned trajectory.

11. The autonomous vehicle of claim 9, wherein the detection system of the plurality of autonomous vehicles fuses the sensor information used for detecting other vehicles with the information received from another vehicle in order to augment sensor perception on the another vehicle.

12. The autonomous vehicle of claim 9, wherein the V2V communication interface is used to classify a type of vehicle, wherein an allowability of overtaking for intersection handling is determined based on the type of vehicle, and wherein overtaking is allowed for a first type of vehicle and overtaking is prohibited for a second type of vehicle.

13. The autonomous vehicle of claim 12, wherein both the first type of vehicle and the second type of vehicle are manned vehicles.

14. The autonomous vehicle of claim 9, wherein the management system is configured to manage at least one out of overtaking and intersection handling of other vehicles, including when the plurality of autonomous vehicles includes a first vehicle on a first road on the mine site and a second vehicle on a second road on the mine site, where the first vehicle and the second vehicle are both driving towards a crossing at which the first road and second road merge into a third road.

15. The autonomous vehicle of claim 9, wherein the centralized platform is configured to store and communicate a mine site map comprising a road network to the plurality of autonomous vehicles for onboard storage, and wherein the collision prediction system of the plurality of autonomous vehicles is configured to determine a road from the road network used by another vehicle in its vicinity based on at least one out of sensor information and information received via V2V interface from the another vehicle.

* * * * *